Oct. 28, 1952  A. C. KRACKLAUER  2,615,574
HORIZONTAL PLATE FILTER
Filed Sept. 9, 1950
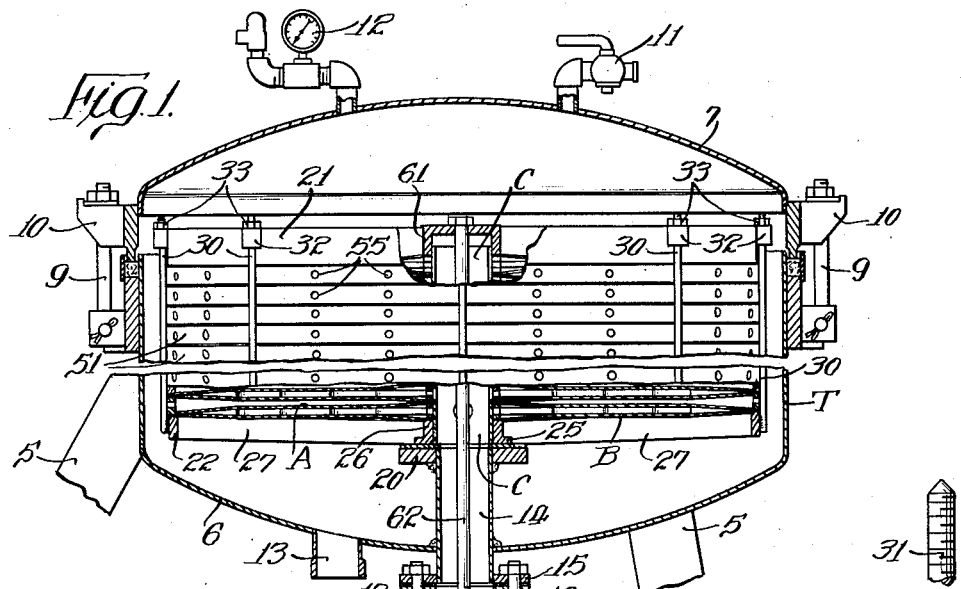
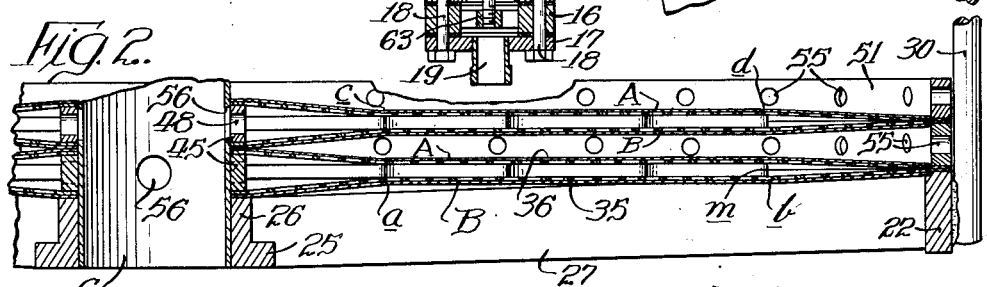
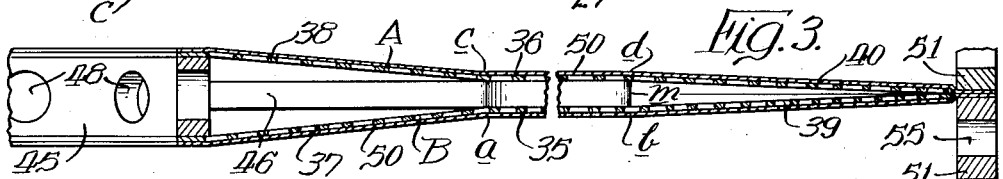
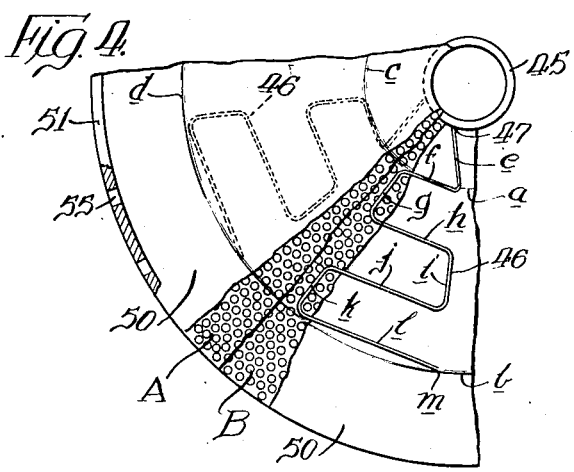
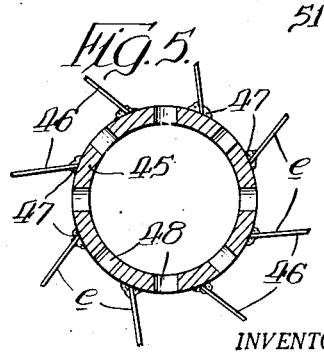
INVENTOR.
Aloysius C. Kracklauer
BY
Banning & Banning
Attys.

Patented Oct. 28, 1952

2,615,574

UNITED STATES PATENT OFFICE 2,615,574

HORIZONTAL PLATE FILTER

Aloysius C. Kracklauer, Mundelein, Ill.

Application September 9, 1950, Serial No. 184,013

11 Claims. (Cl. 210—181)

This invention relates to a filter of the type in which a plurality of horizontal filter units is assembled into a tier within a cylindrical tank, with provision for liquid to circulate through the filtering media thereof and into a central column for gravity outflow therethrough. The present filter is designed primarily for industrial use, and is effective for the clarification of various liquids, and for the separation of solid particles contained in liquid vehicles which may be of many different kinds—acids, oils, syrups, wines, and varnishes being examples.

The features of improvement which characterize the present filter are concerned largely with an improved assembly of elements which together make up each filter unit, and by which replacement of filtering media, whenever necessary or desirable, is facilitated. The present improvements are concerned also with means by which the several filter units arranged in a tier are secured together in unitary relation, the securing means serving also to maintain the several filter units accurately in alignment. An assembly of filter units of this character may be handled as a unit in the operation of lifting them from the tank, or of lowering them thereinto.

These and other features, as will hereinafter appear, constitute certain aspects of my present invention of which a suggestive embodiment is illustrated in the accompanying drawing wherein—

Figure 1 is a central vertical section through the filter apparatus in its entirety;

Fig. 2 is an enlarged fragmentary section diametrically of two filter units and certain associated parts;

Fig. 3 is a further enlarged fragmentary sectional view of one filter unit;

Fig. 4 is a fragmentary view in plan, partly in cross section, of one filter unit; and Fig. 5 is a horizontal section through one of the spacer rings, showing the several ribbon spacers attached thereto.

In the construction shown, there is a cylindrical tank T supported on legs 5, and having a bottom 6 and a removable dome top 7 which may be secured firmly in place by bolts 9 pivoted to the tank and engaging with lugs 10 outstanding from the top. A valve-controlled vent 11 and a pressure-registering gauge 12 are mounted on the top, as shown. Such a construction is common at the present time, and needs no further description.

An inlet pipe 13 is connected to the tank bottom, eccentrically thereof, for delivery thereinto of the liquid which is to be filtered. The discharge opening of the tank is through an axial tube 14 which is affixed to the bottom 6 and extended therethrough to carry at its lower end a fixed ring 15. Below the ring and coaxial therewith is a spider 16, and therebelow a second ring 17 through which pass bolts 18 for securing the two rings 15 and 17 and spider 16 in unitary relation. Depending from the lower ring 17 is a drain outlet 19 so that liquid descending through the column 14 and through the spider will pass out therethrough. At its upper end the tube 14 carries a head 20 which is fixedly joined thereto, as by welding.

The construction thus far described is concerned with the tank, its top, and its inlet and its outlet. There remains to be considered the filter apparatus which operates within such a tank and which comprises essentially a head ring 21, a base ring 22, and an assembly of superposed filter units therebetween. These filter units, of which the number is variable according to the size and capacity of the tank, are interconnected as a unit; since they are all alike, a description of but one will suffice.

Resting on the tube head 20 is the base flange 25 of a hub 26 from which is extended a plurality of radial arms 27, spaced apart perhaps 90°, and each joined at its outer end to the base ring 22 whose top is substantially higher than that of the hub. At points about 45° apart I affix to the outer face of the base ring 22 vertical studs 30 which may be fixedly secured in place, as by welding. The upper end portion 31 of each stud is extended through an apertured lug 32 affixed to the head ring 21, and is screw-threaded to receive thereon a nut 33 which, when rotatively advanced, will engage the lug 32 to apply thereto a downward pressure. The base of the filter apparatus is provided by the hub 26 and the base ring 22 with interconnecting arms 27, the structure being sufficiently sturdy and rigid to sustain the load that is to be imposed thereon.

Referring now to Fig. 2 each filter unit comprises a pair of complementary circular plates A and B each of which is foraminous throughout its full area and centrally apertured to receive therethrough a tubular center column C around which the hub 26 is fitted. The lowermost plate B may be rested upon the top of this hub and is characterized by inner and outer bends $a$ and $b$, each very slight and defining therebetween an extended annular portion 35 which is disposed substantially horizontally. The upper plate A is also provided with similar inner and outer bends $c$ and $d$ to define between them an extended annular horizontal portion designated as 36. Two such plates are arranged reversely of each other so that the inner annular portion 37 of the lower plate B is diverged away from the opposite portion 38 of the upper plate A. The outer annular portions 39 and 40 of the plates B and A respectively converge to meet at their peripheries.

Between each pair of circular plates so arranged is positioned a spacer ring 45 which is fitted around the column C, together with a plurality of spacers 46 each in the form of a ribbon or flat wire, of metal or the like, bent to provide an inner portion e which extends in a generally radial direction, thence through a relatively short circumferential portion f, thence through a further radial portion g, thence through another circumferential portion h of somewhat greater length, thence through another radial portion i, thence through another circumferential portion j of still greater length, thence through a further radial portion k, and finally through another circumferential portion l whose free end m terminates at the bends b and d at the commencement of the outer annular converging portions 39 and 40 of the two plates B and A. The opposite (inner) end of each ribbon is fixedly secured, as by welding 47, to the outer face of the spacer ring 45 through which radial ports 48 are extended at points between adjacent ribbon spacers 46. By the means described, each ribbon spacer, which is of generally zig-zag contour, extends radially outwardly from the associated spacer ring 45 to lie within the confines of the medial annular portions 35 and 36 of the two circular plates B and A. A number of such ribbon spacers, all alike, will be extended outwardly in generally radial fashion from each spacer ring 45, the distance therebetween being perhaps 45°. These spacers—the ring 45 and ribbons extended outwardly therefrom—maintain the two plates A and B separated from each other by a fixed distance, but without interference to flow of liquid therebetween in a generally radial direction.

Each spacer ring 45 lies between a pair of foraminous circular plates A and B adjacent their inner peripheries and, together with the several ribbon spacers, constitutes the principal parts of a filter unit which is completed by the addition of a pair of centrally apertured sheets of filtering cloth, paper or the like. In assembling the filter units in their operative position, a lowermost filtering sheet in the form of a disc 50 is arranged coaxially of the column C and moved down to overlie the top faces of the hub 26, arms 27 and base ring 22; a bottom plate B is then positioned over the disc 50, and thereover is next placed a spacer ring 45 with attached spacer ribbons 46 which lie on the bottom plate B; next follows placement thereover of a top plate A whose diameter is the same as that of the bottom plate B; an outer clamping ring 51 whose inside diameter is substantially the same as that of the circular plates A and B so as to lie entirely radially to the outside thereof is then rested on the filtering disc 50 to engage and compress its peripheral portion, the clamping ring being maintained in coaxial alignment therewith by the several studs 30 which serve as guides therefor, and its top face being disposed substantially level with a point mid-way of the vertical length of the spacer ring 45 that is opposite thereto; and finally another filtering disc 50, the same in diameter as the one first noted, is positioned over the top plate A to extend therebeyond and engage the immediately lower disc in its peripheral position, the bottom plate B of the next filter unit that is to occupy the next higher position being then rested upon the disc so positioned. The tubular column C extends axially of the several superposed filter units, and upon the top clamping ring 51 is rested the head ring 21 whose diameters, inside and out, are substantially the same as those of the several clamping rings.

Each of the clamping rings 51 has a length, i. e., its dimension parallelly of its axis, exceeding that of each spacer ring 45 by a distance equal to the thickness of the two foraminous plates A and B. In each clamping ring there is provided a plurality of radial ports or notches 55 through which liquid may pass in a circulatory movement toward the center column C through which a plurality of ports 56 are provided oppositely of the ports 48 in the spacer rings 45. The path of liquid movement is therefore radially through the ports 55 of the clamping rings 51 into the space which separates a pair of complementary circular plates A and B, thence vertically through opposite filtering discs 50 which overlie the exterior surfaces of each pair of circular plates A and B of adjacent filter units to pass through the perforations thereof into the space between two such plates in the same filter unit, and thence radially inwardly through the ports 56 of the center column C to enter therein and drain downwardly therethrough for eduction from the tank.

In the assembly and disassembly of the filter units, all the components thereof are laid in place, one part resting on another from the hub 26 up to a cap 61 which surmounts the topmost spacer ring 45. The tier of circular plates B and A is supported at its bottom from the hub 26 and radial arms 27 and elsewhere by the spacer rings 45 and ribbon spacers 46. The unsupported outer peripheral portions 39 and 40 of these foraminous plates are self-sustaining due in part to their angular disposition relative to the annular medial portions 35 and 36 thereof.

When the nuts 33 are rotatively advanced, the interengaging peripheral portions of the several filtering discs 50 will be pressed tightly between adjacent clamping rings 51. No leakage of liquid can take place at such points. A tie bolt 62 in engagement with the cap 61 extends axially downwardly through the column C and through the spider 16 to receive a nut 63 which, when rotatively advanced upwardly against the spider, tightens the entire assembly of filter units at points oppositely of the spacer rings 45. The vertical disposition of these spacer rings and the clamping rings 51 is staggered so that the midpoint vertically of one will lie opposite the top or bottom point of the other, and vice versa, due to the elevation of the top of the base ring 22 being correspondingly higher than the top of the hub 26.

The present filter unit assembly is characterized by the placement of one component loosely on top of another, the tubular column C at the center serving to align the foraminous plates A and B and spacer rings 45 which are disposed between alternate pairs of such plates, and the studs 30 upstanding from the base ring 22 acting to align the clamping rings 51 between which the peripheral portions of the loosely placed filtering sheets 50 are compressed when the assembly is completed and tightened up. Disassembly is also a simple operation because, with removal of the cap 61 and head ring 21, each component may be lifted freely and taken out for cleansing or replacement. Fresh replacement filtering sheets may be installed when the filter units are re-assembled, this operation requiring only placement of the discs 50 which are locked in place when engaged by the clamping rings 51 as re-assembly proceeds. When in operation, the hub 26 furnishes the main support for the filter unit assembly, and upon the base ring 22 is built up a sectional cylindrical wall (formed of the superposed clamping rings 51) which is free of the filter unit assembly except for the flexible connections therewith provided by the peripheral portions of the filtering sheets 50 that are extended radially outwardly beyond the several pairs of foraminous plates A and B. In such a construction, the operation of taking down and setting up the filter units is expedited, and leakage between the filtering sheets in their peripheral portions is effectively prevented.

I claim:

1. In a filter apparatus of the type wherein is a tank providing a fixed mounting for a pair of removable horizontal foraminous plates and means to space them apart at all points except at their outer peripheries where they are free to interengage, and wherein is an upstanding tubular column traversing each of the foraminous plates and in communication with the space therebetween, the improvement which comprises a pair of superposed ported clamping rings disposed to the outside of the foraminous plates in close proximity to their outer free interengaging peripheries and entirely radially beyond the outer peripheries of the perforated plates, said plates having spaced approximately horizontal medial portions and converging outer portions and the confronting top and bottom faces of the clamping rings lying in a horizontal plane substantially coincident with the plane which intervenes between the plates at their peripheries, a sheet of filtering material overlying each plate for its full area upon the face thereof that is remote from the other plate, the peripheral portions of the two sheets being extended beyond that of the plates to lie between the confronting faces of the clamping rings, and means for holding one clamping ring tightly against the other to compress therebetween the peripheral portions of the sheets engaged thereby beyond the interengaging outer peripheries of said plates, the arrangement being such that liquid moving through the ported rings is required to pass through the filtering sheets to enter into the space between the foraminous plates en route to the tubular column.

2. In a filter apparatus of the type wherein is a tank providing a fixed mounting for a pair of removable horizontal foraminous plates and means to space them apart at all points except at their outer peripheries where they are free to interengage, and wherein is an upstanding tubular column traversing each of the foraminous plates and in communication with the space therebetween, the improvement which comprises a pair of superposed ported clamping rings disposed entirely radially to the outside of the foraminous plates in close proximity to their outer peripheries, whereby the outer peripheries of the plates are face to intergage, the confronting top and bottom faces of the clamping rings lying in a horizontal plane substantially midway vertically of the space between the plates, spacer means adjacent the column extending horizontally away therefrom for a major portion of the distance to the outer peripheries of the two plates and in engagement therewith to be supported by one and to afford support to the other in a fixed position, the medial portions of the plates being in substantially horizontal parallelism and the outer portions of the plates converging and interengaging, a sheet of filtering material overlying each plate for its full area upon the face thereof that is remote from the other plate, the peripheral portions of the two sheets being extended beyond that of the plates to lie between the confronting faces of the clamping rings, and means for holding one clamping ring tightly against the other to compress therebetween the peripheral portions of the sheets engaged thereby, the arrangement being such that liquid moving through the ported rings is required to pass through the filtering sheets to enter into the space between the foraminous plates en route to the tubular column.

3. In a filter apparatus of the type wherein is a tank providing a fixed mounting for a pair of removable horizontal foraminous plates and means to space them apart at all points except at their outer peripheries where they are free to interengage, and wherein is an upstanding tubular column traversing each of the foraminous plates and in communcation with the space therebetween, the improvement which comprises a pair of superposed ported clamping rings disposed to the outside of the foraminous plates in close proximity to their outer peripheries, the confronting top and bottom faces of the clamping rings lying in a horizontal plane substantially midway vertically of the space between the plates, spacer means adjacent the column extending horizontally away therefrom for a major portion of the distance to the outer peripheries of the two plates and in engagement therewith to be supported by one and to afford support to the other in a fixed position, each plate at a point proximate to the outer end of the spacer means being angled to provide an outermost unsupported portion in non-planar relation to the adjacent portion of the plate thereby to render the plate self-sustaining in its outermost portion, a sheet of filtering material overlying each plate for its full area upon the face thereof that is remote from the other plate, the peripheral portions of the two sheets being extended beyond that of the plates to lie between the confronting faces of the clamping rings, and means for holding one clamping ring tightly against the other to compress therebetween the peripheral portions of the sheets engaged thereby, the arrangement being such that liquid moving through the ported rings is required to pass through the filtering sheets to enter into the space between the foraminous plates enroute to the tubular column.

4. In a filter apparatus of the type wherein is a tank providing a fixed mounting for a pair of removable horizontal foraminous plates and means to space them apart at all points except at their outer peripheries where they are free to interengage, and wherein is an upstanding tubular column traversing each of the foraminous plates and in communcation with the space therebetween, the improvement which comprises a pair of superposed ported clamping rings disposed to the outside of the foraminous plates in close proximity to their outer peripheries, a pair of ported spacer rings surrounding the column and communicating with the interior thereof, the vertical height of the clamping rings exceeding that of the spacer rings by a distance substantially equal to the thickness of two foraminous plates and the vertical positions of the clamping rings being staggered with respect to the spacer rings so that top face of one is disposed in a horizontal plane approximately midway of the height of the other, each foraminous plate being configured to provide a medial portion and inner and outer portions integral therewith but angled with respect thereto to extend parallelly away therefrom, the two plates being assembled with the inner portions diverged away from each other to overlie and engage the top and bottom faces of one spacer ring and with the outer portions converged toward each other to meet at substantially their outer peripheries in approximately the plane of the top and bottom faces of two abutting clamping rings, a sheet of filtering material overlying each plate for its full area upon the face thereof that is remote from the other plate, the peripheral portions of the two sheets being extended beyond that of the plates to lie between the confronting faces of the clamping rings, and means for holding one clamping ring tightly against the other to compress therebetween the peripheral portions of the sheets engaged thereby, the arrangement being such that liquid moving through the ported rings is required to pass through the filtering sheets to enter into the space between the foraminous plates en route to the tubular column.

5. In a filter apparatus of the type wherein is a tank providing a removable fixed mounting for the inner peripheral portions of a pair of apertured horizontal foraminous plates through which is extended a tubular column in communication with the space between the plates, the improvement which comprises spacer means joined to the fixed mounting and extending outwardly therefrom into the space between the two plates for engagement therewith to be supported by one and to afford support to the other, the spacer means terminating substantially short of the outer periphery of the two plates to leave portions thereof wholly unsupported and each plate being angled at a point proximate to such termini of the spacer means to converge toward the other to meet therewith at its outer periphery and medial portions of the plates being disposed in substantially horizontal parallelism, a pair of superposed ported clamping rings disposed to the outside of the foraminous plates in close proximity to their outer peripheries and entirely radially beyond the same whereby the meeting interengaging outer peripheries of the plates are free, a sheet of filtering material overlying each plate for its full area upon the face thereof that is remote from the other plate, the peripheral portions of the two sheets being extended beyond that of the plates to lie between the confronting faces of the clamping rings, and means for holding one clamping ring tightly against the other to compress therebetween the peripheral portions of the sheets engaged thereby beyond the free outer peripheries of said plates, the arrangement being such that liquid moving through the ported rings is required to pass through the filtering sheets to enter into the space between the foraminous plates en route to the tubular column.

6. In a filter apparatus of the type wherein is a tank providing a removable fixed mounting for the inner peripheral portions of a pair of apertured horizontal foraminous plates having their outer peripheries interengaged, and provided centrally with registering apertures through which is extended a tubular column in communication with the space between the plates, the improvement which comprises spacer means joined to the fixed mounting and extending radially outwardly therefrom into the space between the two plates for engagement therewith to be supported by one and to afford support to the other, the spacer means terminating substantially short of the outer periphery of the two plates to leave portions thereof wholly unsupported and spacing the medial portions in substantially horizontal parallelism, a pair of superposed ported clamping rings disposed to the outside of the foraminous plates in close proximity to their outer peripheries, a sheet of filtering material overlying each plate for its full area upon the face thereof that is remote from the other plate, the peripheral portions of the two sheets being extended beyond that of the plates to lie between the confronting faces of the clamping rings, and means for holding one clamping ring tightly against the other to compress therebetween the peripheral portions of the sheets engaged thereby beyond the outer peripheries of the plates, the arrangement being such that liquid moving through the ported rings is required to pass through the filtering sheets to enter into the space between the foraminous plates en route to the tubular column.

7. In a filter apparatus of the type wherein is a tank having an upstanding tubular column traversing a plurality of superposed filter units each including a pair of spaced foraminous circular plates, the improvement which comprises a plurality of like ported spacer rings closely surrounding the column, one disposed between each alternate pair of plates to provide an inner support therefor, a plurality of like ported clamping rings each having a vertical height slightly exceeding that of the spacer rings and an inside diameter slightly greater than that of the foraminous plates so as to lie outwardly thereof in proximity thereto, the vertical positions of the clamping rings being staggered with respect to the inner rings so that the top face of one is disposed in a horizontal plane approximately midway of the height of the other, spacer means joined to each spacer ring and extended outwardly therefrom into the space between the two plates for engagement therewith to be supported by one and to afford support to the other, the foraminous plates outwardly of the spacer means having portions converging toward each other to meet at their outer peripheries, a sheet of filtering material overlying each plate for its full area upon the face thereof that is remote from the other plate, the peripheral portions of the two sheets being extended beyond that of the plates to lie between the confronting faces of the clamping rings, and means for holding one clamping ring tightly against the other to compress therebetween the peripheral portions of the sheets engaged thereby, the arrangement being such that liquid moving through the ported rings is required to pass through the filtering sheets to enter into the space between the foraminous plates en route to the tubular column.

8. In a filter apparatus of the type wherein is a tank having an upstanding tubular column traversing a plurality of superposed filter units each including a pair of spaced foraminous circular plates, the improvement which comprises a plurality of like ported spacer rings closely surrounding the column, one disposed between each alternate pair of plates to provide an inner support therefor, a plurality of like ported clamping rings each having a vertical height slightly exceeding that of the spacer rings and an inside diameter slightly greater than that of the foraminous plates so as to lie outwardly thereof in proximity thereto, the vertical positions of the clamping rings being staggered with respect to the spacer rings so that the top face of one is disposed in a horizontal plane approximately midway of the height of the other, the foraminous plates outwardly of the spacer rings having portions converging toward each other to meet at their outer peripheries, a sheet of filtering material overlying each plate for its full area upon the face thereof that is remote from the other plate, the peripheral portions of the two sheets being extended beyond that of the plates to lie between the confronting faces of the clamping rings, and means for holding one clamping ring tightly against the other to compress therebetween the peripheral portions of the sheets engaged thereby, the arrangement being such that liquid moving through the ported rings is required to pass through the filtering sheets to enter into the space between the foraminous plates en route to the tubular column.

9. In a filter apparatus of the type wherein is a tank having an upstanding tubular column traversing a plurality of superposed filter units each including a pair of reversely arranged spaced circular plates consisting of substantially horizontal annular medial portions, diverging inner annular portions and outer annular portions converging to meet at their outer peripheries, sheets of filtering material laid over the outer faces of each pair of foraminous plates, and ported spacer rings closely surrounding the column and positioned between the inner diverging portions of alternate pair of plates to provide an inner support therefor, the improvement which comprises a base ring to the outside of the peripheries of the foraminous plates and below the lowermost one thereof, the filtering sheets being extended outwardly beyond the peripheries of the foraminous plates comprised in the bottommost filter unit to overlie the top face of the base ring, a plurality of studs upstanding fixedly from the outer face of the base ring to a point beyond the topmost filter unit, a plurality of clamping rings arranged in superposed relation above the base ring between adjacent filter units and each coacting with the next adjacent clamping ring to receive therebetween the peripheral portions of filtering sheets comprised in the several filter units, the several upstanding studs being disposed to the outside of the clamping rings in close proximity thereto to serve as a centering means therefor, a head ring surmounting the topmost clamping ring, and screw means connecting each stud with the head ring to draw the same downwardly whereby to compress the peripheral portions of the several filtering sheets between the clamping rings.

10. In a filter apparatus of the type wherein is a tank having an upstanding tubular column traversing a plurality of superposed filter units each including a pair of reversely arranged spaced circular plates consisting of substantially horizontal annular medial portions, diverging annular inner portions and outer annular portions converging to meet at their outer peripheries, sheets of filtering material laid over the outer faces of each pair of foraminous plates, ported spacer rings closely surrounding the column and positioned between the inner diverging portions of alternate pair of plates to provide an inner support therefor, and means for supporting the lowermost spacer ring in a fixed position on the column, the improvement which comprises a base ring to the outside of the peripheries of the foraminous plates and below the lowermost one thereof, supporting means for the base ring in rigid connection with the means for supporting the lowermost spacer ring, the filtering sheets being extended outwardly beyond the peripheries of the foraminous plates comprised in the bottommost filter unit to overlie the top face of the base ring, a plurality of studs upstanding fixedly from the outer face of the base ring to a point beyond the topmost filter unit, a plurality of clamping rings arranged in superposed relation above the base ring between adjacent filter units and lying entirely radially beyond the outer peripheries of said plates and each coacting with the next adjacent clamping ring to receive therebetween the peripheral portions of filtering sheets comprised in the several filter units, the several upstanding studs being disposed to the outside of the clamping rings in close proximity thereto to serve as a centering means therefor, a head ring surmounting the topmost clamping ring, and screw means connecting each stud with the head ring to draw the same downwardly whereby to compress the peripheral portions of the several filtering sheets between the clamping rings.

11. In a filter apparatus of the type described, a pair of reversely arranged circular foraminous plates having central openings and consisting of spaced medial substantially horizontal portions, inwardly diverging portions and outer converging portions meeting and interengaging at the outer peripheries of said plates, a ported spacer ring arranged between the diverging inner portions of said plates at the central openings thereof, ribbon spacers extending radially from the spacer ring and composed of radial and circumferential portions arranged at intervals in general zig-zag contour and increasing in length outwardly, said spacer ribbons terminating adjacent the outer extremities of the medial portions of said plates, thereby leaving the converging outer portions free, a pair of superposed ported clamping rings disposed entirely radially to the outside of the foraminous plates in close proximity to their outer peripheries, a sheet of filtering material overlying each plate for its full area upon the face thereof that is remote from the other plate, the peripheral portions of the two sheets being extended beyond the confronting faces of the clamping rings, and means for holding one clamping ring tightly against the other to compress therebetween the peripheral portions of the sheets engaged thereby, the arrangement being such that liquid moving through the ported clamping rings is required to pass through the filtering sheets to enter into the space between the foraminous plates enroute toward the ported spacer rings.

ALOYSIUS C. KRACKLAUER.

REFERENCES CITED

The following references are of record in the file of this patent:

UNITED STATES PATENTS

| Number | Name | Date |
|---|---|---|
| 608,034 | Feroe | July 26, 1898 |
| 1,332,996 | Perry | Mar. 9, 1920 |
| 1,475,577 | Green | Nov. 27, 1923 |
| 2,278,453 | Kracklauer | Apr. 7, 1942 |
| 2,390,539 | Katcher | Dec. 11, 1945 |
| 2,392,537 | Klopfenstein | Jan. 8, 1946 |

FOREIGN PATENTS

| Number | Country | Date |
|---|---|---|
| 512,972 | Great Britain | Sept. 29, 1939 |
| 113,788 | Australia | Sept. 11, 1941 |
| 69,781 | Germany | July 19, 1893 |